May 27, 1958
G. L. BORELL ET AL
2,836,783
AIRCRAFT CONTROL SERVOSYSTEM
Original Filed Feb. 24, 1945
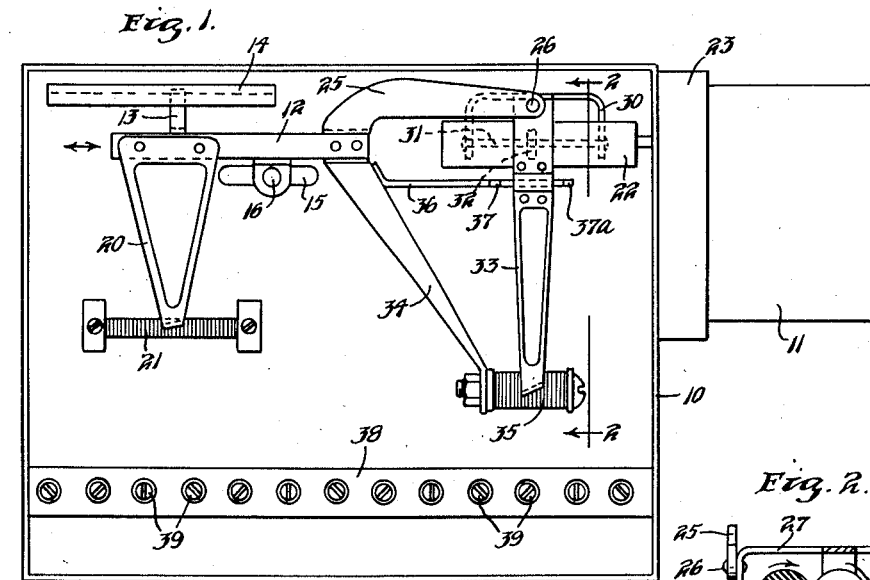
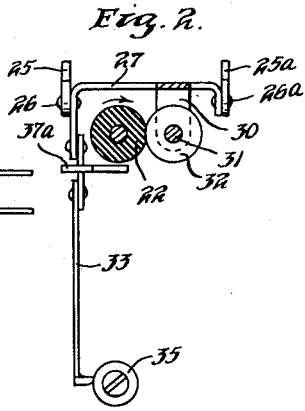
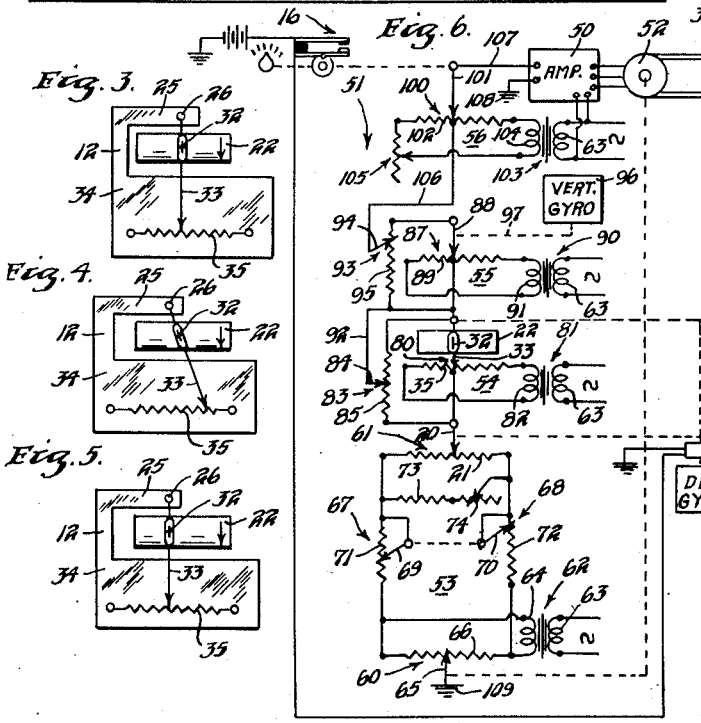
Inventors
GEORGE L. BORELL
DANIEL G. TAYLOR
*George H. Fisher*
Attorney

United States Patent Office 2,836,783
Patented May 27, 1958

2,836,783

AIRCRAFT CONTROL SERVOSYSTEM

George L. Borell and Daniel G. Taylor, Minneapolis, Minn., assignors to Minneapolis-Honeywell Regulator Company, Minneapolis, Minn., a corporation of Delaware Original application February 24, 1945, Serial No. 579,586. Divided and this application April 12, 1948, Serial No. 20,526

18 Claims. (Cl. 318—489)

This application is a divisional application of our prior application 579,586, filed February 24, 1945, now Patent No. 2,476,276, July 19, 1949.

The majority of control apparatus are operated by condition responsive devices which are responsive to the magnitude and direction of change of a condition. It is often desirable, however, to provide in an apparatus a condition responsive device which is responsive to the rate of change of condition instead of to the magnitude of the change, and this may be true whether the instrument is measuring temperature, angular deviation, humidity, or other variable which it is desired to control. In the usual condition responsive device, a change in condition is measured by movement of a member such as the lever or indicator of a thermostat, the vane or indicator of a galvanometer, et cetera. The velocity of this change in condition will be the first derivative of the displacement with respect to time, or, expressed mathematically, $$v = \frac{ds}{dt}$$

Similarly, if a device measures the velocity or rate of change, the first derivative of this indication will be the acceleration of the change, or, expressed mathematically, $$a = \frac{dv}{dt}$$

In many control apparatus it is desirable to provide a signal which is proportional to the rate of change of a condition and to use this signal alone or to use it in conjunction with a signal which indicates the absolute value of that condition.

Control apparatus have been known which operate from a signal which is a combination of the signals determined by the deviation of the condition from a predetermined value and by the velocity of change of that condition; but such apparatus are unsatisfactory where it is desired to manually vary the effective amount of the velocity signal independently of the deviation signal.

It is therefore a major object of our invention to provide a control apparatus which includes a control device which produces a signal proportional to the first derivative of a condition to be measured but which signal may be manually modified.

It is another object of our invention to provide in such apparatus such a device which may be combined in a very simple manner with a control device which provides a signal proportional to the deviation of the condition to be measured.

It is a further object of our invention to provide a control apparatus with a deviation signal generating means and a rate of deviation generating means operable from one condition responsive device.

It is a still further object of our invention to provide in such apparatus means for manually selecting any portion of said deviation or rate of deviation signals obtained from said generating means.

It is still another object of our invention to provide a control apparatus wherein signals corresponding to extent and rate of deviation of a condition are separately provided and controlled.

It is also an object of our invention to provide apparatus having means separately operated by a deviation responsive means for providing deviation and rate of deviation signals for controlling the position of a control surface on an aircraft and further means for adjusting the position of the control surface with respect to said deviation responsive means to retain the separatively operated means in a normal position.

It is a still further object of our invention to manually control such apparatus while rendering said deviation and rate of deviation signal means ineffective in said apparatus.

These and other objects of our invention will become apparent from the following description of a preferred form thereof and from the drawings illustrating that form, in which Figure 1 is an elevational view of our improved control device, Figure 2 is a view taken at 2—2 in Figure 1, Figures 3, 4, and 5 are schematic diagrams illustrating the operation of the device when the operating member is displaced, and Figure 6 is a schematic wiring diagram of our improved control apparatus used to operate the rudder of an aircraft and illustrating how our invention may be applied thereto.

Referring now to the drawing and particularly to Figure 1 thereof, the numeral 10 indicates a housing to which is attached a small, substantially constant speed motor 11. The motor 11 may be of any suitable type, designed for use on any suitable voltage available, but it should run at a substantially constant speed, though the power output required is not large. Within the housing 10 we provide a slidable carrier 12 which is suitably mounted for horizontal reciprocatory motion, such as might be provided by guides (not shown) on the rear wall of the housing 10 and a slider 13 cooperating with a guide 14. Slider 13 and guide 14, together with the guides on the rear wall of the housing 10, cooperate to permit horizontal movement of the carrier 12 but prevent other translatory motion or rotation. A slot 15 may be provided in the rear wall of the housing 10 through which an operating arm (not shown) may extend and engage an ear 16 which is rigidly attached to carrier 12.

To provide the signal which is proportional to the displacement of the carrier 12 from its normal position, we prefer to mount a wiper 20 on the left end of the carrier 12 so that the wiper moves in synchronism with the carrier. The lower end of wiper 20 bears against a resistor 21 which is mounted on the rear wall of the housing 10, with its axis parallel to the line of movement of the carrier, so that as the wiper is moved along the resistor 21, the resistance between the wiper 20 and a point on the resistor 21 will vary. The resistance 21 may be provided with a center tap; and by properly aligning the carrier 12, it is possible to have the wiper 20 aligned with the center tap when the carrier 12 is in its mid-position, which will generally correspond to its normal position. Any deviation from this normal position will therefore be immediately indicated by a change in resistance between the wiper 20 and the center tap of resistor 21.

Within the housing 10 and driven by motor 11 is a cylinder 22, preferably rubber covered, and mounted so that its axis is parallel to the line of movement of carrier 12. The cylinder 22 is driven at a substantially constant speed, and the minimum value of this speed is determined by the diameter of the cylinder and the anticipated period of the reciprocatory movement of carrier 12. We have illustrated a gear reduction 23 between the motor 11 and the cylinder 22 since it is easier to secure the desired driving speed of the cylinder in this manner.

On the right hand end of carrier 12 we provide a pair of cantilever arms 25 and 25a which extend in a direction generally parallel to the axis of the cylinder 22 and slightly above the latter. Pivots 26 and 26a are provided at the outer ends of arms 25 and 25a, respectively; and mounted thereby is a supporting member 27 which extends between the arms 25 and 25a, bridging over the cylinder 22.

Connected to the supporting member 27, or formed as a part of it, is a yoke 30 whose base extends generally parallel to the axis of the cylinder 22 and whose arms are bent downwardly to carry a shaft 31 which extends generally parallel to the axis of the cylinder 22. Centrally mounted on the shaft 31 so that it is aligned with the pivots 26 and 26a is a roller 32 which bears against and is rotated by the cylinder 22. By arranging the pivots 26 and 26a, the cylinder 22, and the roller 32 in the manner just described, these members cooperate so as to tend to maintain the axis of the roller 32 parallel to that of the cylinder 22 when the latter revolves as shown in Figure 2. If this parallel relationship is disturbed, a force is developed between the cylinder 22 and the roller 32 which attempts to pivot the latter until its axis is parallel to the axis of the cylinder.

Connected to the member 27 and extending downwardly therefrom, we provide a wiper 33 suitably insulated from the member 27 but operated thereby so that wiper 33 may turn about pivots 26 and 26a as roller 32 likewise pivots about them. The caster action of the roller 32 with respect to cylinder 22 is thus transmitted to wiper 33.

Extending downwardly and to the right from the carrier 12 is a support 34 which carries a resistor 35 at its lower end. The resistor 35 is aligned with the pivots 26 and 26a so that wiper 33 may bear against the resistor and traverse it as the wiper rotates about the pivots. In the form shown we have placed the resistor 35 so that its axis is parallel to the axis of the cylinder 22, and its center point is located on a line which is perpendicular to the axis of the cylinder and which passes through the axis of the pivots 26 and 26a. This alignment is maintained as carrier 12 is moved back and forth, since the cantilever arms 25 and 25a and the support member 34 are rigidly attached to the carrier 12 and the whole moves as an integral part. To prevent the wiper 33 from swinging too far and going beyond the ends of the resistor 35, we provide a stop 36 attached to the supporting member 34 and having a pair of arms 37 and 37a extending forwardly on each side of the wiper 33 to limit the motion of the latter. The resistor 35 may be provided with a center tap; and by properly aligning the support 34 with the pivot points 26 and 26a, the wiper 33 will normally be aligned with the center tap so that any movement of the wiper about the pivot point will be indicated by a change in resistance between the wiper and the center tap. If a voltage source is connected to the ends of resistor 35, any movement of wiper 33 away from the center tap will cause a voltage to appear between the wiper and the center tap thus providing a voltage signal whose magnitude varies as the displacement of the wiper from the center tap.

To complete the control device, a terminal strip 38 having a series of terminals 39 thereon may be installed in the lower portion of the housing 10; and all connections to wipers, resistors, and motor 11 may be made thereon.

*Operation of device*

In the operation of our device, it will be apparent that movement of the ear 16 by the operating member of the condition responsive device will cause the wiper 20 to move across the resistor 21, thereby providing a signal in the manner previously described. However, the operation of the wiper 33 and the resistor 35 is not so obvious, and for a clearer understanding of this portion of the device, reference should be had to Figures 3, 4, and 5. In these figures the schematic representations of the various parts have been given the same reference numerals as the parts just described.

Starting at Figure 3, it will be seen that a wiper 25, pivotally mounted at 26, makes contact with a resistor 35 while a roller 32 is mounted on wiper 33 and bears against rotating cylinder 22. The numerals 25 and 34 indicate the cantilever arms and the support, respectively. As previously mentioned, the cylinder 22, the roller 32, and the pivoted wiper 33 cooperate to urge the roller to assume a position wherein its axis is parallel to the axis of the rotating cylinder or, expressed differently, so that the plane of the roller is perpendicular to the axis of the cylinder.

However, if the carrier 12 is now moved to the left, as indicated in Figure 4, the roller 32 will tend to lag behind because of the restraint imposed upon it by the cylinder 22, which is rubber covered to prevent the slipping of the roller upon it. When the roller 32 lags behind the pivot point 26, wiper 33 is moved about the pivot point so as to rotate counter-clockwise, as shown in Figure 4, thereby moving across resistor 35 and causing a signal to be generated as previously described. As carrier 12 is moved, the roller 32 lags behind the pivot point 26 until the angle between the axes of the roller and the cylinder 22 is great enough to allow the roller to move at the same rate as the carrier, the size of the angle, of course, depending upon the speed of the carrier. The displacement of wiper 33 on resistor 35 will thus be proportional to the rate of displacement of carrier 12, and the voltage signal produced will likewise be proportional to the same rate of displacement. The force tending to return the axis of roller 32 to its position parallel to the axis of cylinder 22 is acting during the time, but it is overcome by the movement of carrier 12. As the rate of movement of the carrier 12 decreases, however, this force urges the wiper 33 toward its original position; and as the carrier comes to rest, the wiper will approach the position of the center tap, as shown in Figure 5.

If the carrier 12 were moved to the right instead of to the left, the roller 32 and wiper 33 would be restrained as before, but instead of the wiper's being moved toward the right end of resistor 35, it would be moved toward the left end and would then center itself as previously described.

If the cylinder 22 were not rotating, and if carrier 12 were moved toward the right, roller 32 would be restrained against lateral movement by the friction between it and the rubber of cylinder 22, and hence wiper 33 would be displaced toward the left end of resistor 35. However, when the carrier 12 reached its final position, there would be no restoring force tending to realign roller 32 with cylinder 22, and hence the signal put in by wiper 33 and resistor 35 would be left in even though there were no further need or desire for it. However, as the surface speed of the cylinder 22 is increased, wiper 33 will lag less and less behind pivot point 26. Hence, unless a mechanical linkage is used or the characteristics of the electrical system are materially changed, a much smaller signal will be provided when the cylinder 22 is turned at a greater rate of speed.

When the anticipated speed of the carrier 12 has been determined, the minimum speed of the cylinder 22 may then be determined. This may be done experimentally, but it is generally preferable to do it mathematically since an experimental determination will require more time and materials to be expended on a relatively simple problem. It may be shown that when the roller 32 is turned so that its axis is at an angle to the axis of the cylinder 22, the path it then traces on cylinder 22 as it returns to its normal position will be a tractrix. The equation for a tractrix may be found in mathematics tests (e. g. page 331 of Osgood's Advanced Calculus) and is $$y = (k^2 - x^2)^{1/2} - k \log_e \frac{k + (k^2 - x^2)^{1/2}}{x}$$

In this equation $x$ is the lateral displacement of the roller 32 measured from a line which passes through the axis of the pivot points 26 and 26a and which extends perpendicular to the axis of the cylinder 22; $y$ is the distance which the surface of the cylinder 22 has moved; and $k$ is the distance between the point of contact between cylinder 22 and roller 32, and the axis of the pivot points 26 and 26a.

Since a tractrix approaches an asymptote, theoretically the roller 32 will never return to its normal position once it has been displaced. However, because of the physical size of the wire used in resistor 35, it is unnecessary that the exact position be regained, since if the wiper 33 touches the desired turn of the resistor element, the effect is the same. Since the anticipated speed of displacement of the carrier 12 is known or may be estimated, the necessary speed of the cylinder 22 may be calculated by suitable mathematical analysis, or may be determined by experimental means. By way of example only, and not as a limitation, in one application of this device it was anticipated that carrier 12 would be oscillated back and forth at a rate of one cycle in approximately two or three seconds. The diameter of cylinder 22 was approximately three-eighths of an inch, and under these conditions it was found that when the cylinder was rotated at approximately 120 revolutions per minute, very satisfactory results were obtained and a velocity signal was obtained from resistor 35. In this case, a mathematical anaylsis was first made to determine the necessary rotational speed, and this was later verified by experimental results. It may be shown that by a proper choice of surface speed of the cylinder 22, the wiper 33 may be caused to be displaced an amount proportional to the velocity of movement of the carrier 12, and thus we have secured the first derivative of the displacement of the carrier 12.

Construction of apparatus

One of the features of our invention is the design of a control apparatus in which a velocity signal is provided that may be controlled independently of a deviation signal. It will be apparent that an apparatus such as this will have application in temperature control systems where it is desirable to have a type of anticipating control which will provide a greater quantity of fuel for the heater when the temperature is dropping rapidly than when it is merely drifting away from the desired point. In addition, however, our apparatus finds one of its greatest uses in the field of aircraft control apparatus such as the automatic pilot. An example of such apparatus is found in the copending file of Robert J. Kutzler and Theodore J. Wilson, Serial No. 469,626, filed December 21, 1942, which has matured into Patent No. 2,515,349, granted July 18, 1950. In Figure 6 we have illustrated how their control apparatus may be modified to provide our improved control apparatus and thereby secure superior operation. We have shown only the rudder network with its associated amplifier and servo motor since the other networks, the aileron and elevator networks, are independent of the rudder network in both the original apparatus and in our improved apparatus.

As shown in Figure 6, an amplifier 50 receives power from a source of alternating current (not shown) and also receives signals from a network 51. In accordance with these signals, the amplifier 50 controls the operation of a servo motor 52 to position the rudder (not shown) of an aircraft by means of cables.

The network 51 includes a bridge 53 and three smaller networks 54, 55, and 56, all connected in series with the bridge 53 and amplifier 50. Bridge 53 includes a rebalancing potentiometer 60, a deviation potentiometer 61, and a source of power such as a transformer 62 having a primary winding 63 and a secondary winding 64. The rebalancing potentiometer 60 has a wiper 65 which bears against a resistor 66 whose ends are connected to the secondary terminals of transformer 62. The deviation potentiometer 61 is the same as that previously described in the description of our control device and includes wiper 20 which bears against resistor 21. One end of resistor 21 is connected through a centering potentiometer 67 to the corresponding end of resistor 66, and the opposite end of resistor 21 is connected through a centering potentiometer 68 to the corresponding end of resistor 66. Centering potentiometer 67 has a wiper 69 which bears against a resistor 71, and similarly, centering potentiometer 68 has a wiper 70 which bears against a resistor 72. Wiper 69 is electrically connected to one end of resistor 71, and wiper 70 is similarly connected to one end of resistor 72. It will thus be seen that by changing the position of wipers 69 and 70, a greater or lesser amount of resistors 71 and 72, respectively, will be shorted; and the two wipers 69 and 70 are mechanically connected together so that as a greater portion of one resistor is shorted a smaller portion of the other is shorted. The resistors 71 and 72 each have the same total resistance so that a circuit traced through potentiometers 67, 61 and 68 will have the same value regardless of the position of the wipers 69 and 70. The only effect of the potentiometers 67 and 68, therefore, is to shift the point on resistor 21 at which wiper 20 must be located in order for a balanced bridge to result for a given setting of wiper 65 on resistor 66. To complete the bridge, a branch consisting of a fixed resistor 73 and a rheostat 74 is connected in parallel with deviation potentiometer 61. Wiper 65 of rebalancing potentiometer 60 is grounded at 109, and wiper 20 of deviation potentiometer 61 is connected to network 54.

Network 54 includes a velocity potentiometer 80 consisting of wiper 33 and resistor 35, previously described, and a source of power such as a transformer 81 having a secondary winding 82 and a primary winding 63. It will be noted that the primary winding of transformer 81 is given the same reference numeral as that of the primary winding of transformer 62, since it is generally more convenient in this system to use a transformer having a plurality of secondary windings and but a single primary winding. However, individually energized transformers may be used if desired. The ends of resistor 35 are connected to the terminals of the secondary 82 of transformer 81, and a center tap is provided on resistor 35 which is connected to wiper 20 of the deviation potentiometer 61. A voltage divider potentiometer 83, consisting of a wiper 84 which bears against a resistor 85, has its lower end connected to the center tap of resistor 35, and the upper end is connected to wiper 33 of the velocity potentiometer 80.

Since the ends of resistor 35 are connected to a voltage source, a voltage will appear between the center tap of the resistor and wiper 33 thereof whenever the wiper is displaced from its center position; and the amount of this voltage which is transmitted to the remainder of the network 51 may be selected by positioning wiper 84 of the voltage divider potentiometer 83. It will be seen that when wiper 84 is at the lower end of resistor 85, none of the voltage developed between the wiper 33 and the center tap of resistor 35 will be transmitted to the remainder of the network 51; but the voltage developed in bridge 53 will be transmitted without change to the remainder of the network. If the wiper 84 is at the upper end of resistor 85, the entire voltage developed between the wiper 33 and the center tap of resistor 35 will be transmitted through the remainder of the network as will all of the voltage signal developed in bridge 53.

To operate the wipers 20 and 33 we provide an azimuth responsive instrument such as a directional gyroscope 86 which operates the wipers through a mechanical means 12 corresponding to the carrier 12. The particular form of the azimuth responsive instrument 86 forms no part of our invention, since such instruments are well known in the art, the most important limitation being that the instrument be provided with an indicating means which may engage the ear 16 as shown in Figure 1.

Network 55 includes a potentiometer 87 having a wiper 88 and a center tapped resistor 89 which is energized by a suitable source of power such as a transformer 90 having a secondary winding 91 and a primary winding 63. A conductor 92 connects wiper 84 of the voltage dividing potentiometer 83 to the center tap of resistor 89; and since the ends of the latter resistor are connected to the secondary terminals of transformer 90, any movement of wiper 88 away from the center position will cause a voltage to appear between the wiper and conductor 92. To provide means for varying the amount of this voltage which is available for transmission to the rest of the network 51, we provide a second voltage dividing potentiometer 93 having a wiper 94 which bears against a resistor 95. One end of resistor 95 is connected to wiper 88 and the other end thereof is connected to conductor 92 so that the amount of signal available from network 55 may be varied from a minimum when the wiper is at the lower end of resistor 95 to a maximum when wiper 94 is at the upper end of the resistor.

To operate wiper 88, we provide a vertical gyroscope 96 connected to the wiper by means of a linkage 97 so arranged that as the plane banks or rolls about its longitudinal axis wiper 88 is moved away from its center position for reasons hereinafter described. As the aircraft returns to its level flight, wiper 88 is returned to its center position, and should the craft roll in the opposite direction, wiper 88 will be moved toward the other end of resistor 89.

Network 56, the remaining network in the series, is provided so that the pilot may turn the aircraft without disturbing any of the other adjustments which have previously been made. Included in network 56 are a turn control potentiometer 100 having a wiper 101 which bears against a center tapped resistor 102, and a source of power such as a transformer 103 having a secondary winding 104 and a primary winding 63. One end of resistor 102 is connected to one of the secondary terminals of transformer 103, and the other end is connected through a rheostat 105 to the remaining secondary terminal. A conductor 106 connects wiper 94 of the second voltage divider potentiometer 93 to the center tap of resistor 102, and wiper 101 of the turn control potentiometer 100 is connected to one of the input terminals of amplifier 50 by conductor 107. As in previous cases, any displacement of the wiper 101 from its center position will cause a voltage to appear between conductor 106 and the wiper, the amount of this voltage depending upon the degree of displacement of the wiper and the voltage applied across the ends of the resistor 102. To vary the voltage which appears thereacross, we provide rheostat 105 connected in series with resistor 102 so that while the output voltage of the secondary winding 104 remains a constant, the voltage which appears across the resistor 102 may be varied to conform to the requirements of a particular aircraft.

To complete the input circuit to amplifier 50, the remaining input terminal is grounded as at 108 and the wiper of the rebalancing potentiometer 60 is grounded as at 109. The amplifier 50 is constructed so that when an A. C. voltage signal is impressed upon its input terminals, an output circuit is energized which will cause the connected servo motor 52 to rotate in one direction. If the phase of the input voltage is reversed, the amplifier 50 will complete another output circuit which will cause the servo motor 52 to drive in the opposite direction. The design and construction of the amplifier 50 and servo motor 52 as such form no part of our invention, since such devices are known in the art and may be seen in the patents to Whitman 1,942,587 or Anschutz-Kaempfe 1,586,233.

The operation of the amplifier 50 and motor 52 is such that the motor will continue to operate so long as a voltage signal is impressed upon the input terminals of the amplifier. Therefore, in order to secure the balancing action which we require, we operate the wiper 65 of the rebalancing potentiometer 60 by the servo motor 52 so that as the motor operates, the wiper 65 is moved across resistor 66 to balance out the signal causing operation of the motor. This mechanical connection is indicated by the dotted line extending from the servo motor 52 to the wiper 65.

Of the various potentiometers in the network 51, the rebalancing potentiometer 60 is controlled by the servomotor 52 as just described, the deviation potentiometer 61 is controlled by the azimuth responsive instrument 86, as is the velocity potentiometer 80, and potentiometer 87 is controlled by the vertical gyroscope 96. The remaining potentiometers are manually operated, and these include the centering potentiometers 67 and 68 which are mechanically connected to a single operating knob, the ratio rheostat 74, the first voltage dividing potentiometer 83, the second voltage dividing potentiometer 93, the turn control potentiometer 100, and the rheostat 105.

*Operation of apparatus*

In the operation of our apparatus shown in Figure 6, let it be assumed that the aircraft is in the air and has acquired a heading in azimuth which it is desired to maintain.

To maintain the craft in the desired heading, the pilot will center the wiper 20 of the deviation potentiometer 61, and the wiper 33 of the velocity potentiometer 80 will thereupon automatically center itself if the cylinder 22 is rotating. The plane is assumed to be flying with the wings level; and wiper 88 of potentiometer 87 will be aligned with the center tap of resistor 89 by the vertical gyroscope 96 when these conditions are met. The wiper 101 of the turn control potentiometer 100 should be centered, and networks 54, 55, and 56 will now be balanced so that they produce no voltage signals which would be transmitted to the amplifier 50. Bridge 53, however, may or may not be balanced; and it is essential that this bridge, along with all the other networks, be balanced before the control system is engaged. The balancing operation is performed by varying the position of wipers 69 and 70 of the centering potentiometers 67 and 68, respectively, so that the electrical position of wiper 20 of the deviation potentiometer 61 is shifted so that it has a position corresponding to that of wiper 65 of the rebalancing potentiometer 60. Shifting the electrical position of wiper 20 of the deviation potentiometer 61 is accomplished by increasing the effective resistance of one of the centering potentiometers while at the same time decreasing the effective resistance of the other centering potentiometer so that while the wiper 20 remains stationary the effect is the same as if resistor 21 had been moved beneath it.

When the entire network 51 is in balance so that there is no voltage signal appearing between conductor 107 and ground, the system may be engaged so that the amplifier 50 will thereafter control the servomotor 52. Under these conditions, the plane will fly in a straight course in the heading desired until some external force causes it to change that heading. As soon as the heading changes, the azimuth responsive instrument 86 will cause the carrier 12 to move wiper 20 of the deviation potentiometer 61 an amount corresponding to the deviation in heading. At the same time, as has been previously explained, the movement of the member 12 will cause the wiper 33 of the velocity potentiometer 80 to be displaced from its center position on the resistor 35, the amount of this displacement depending upon the speed of deviation of the plane from the desired heading. The signal from deviation potentiometer 61 will be transmitted to network 54, through conductors 92, 106, and 107, to amplifier 50 where it will cause the servomotor 52 to operate to reposition the rudder. By properly phasing the various elements of the system, the rudder will be turned so that it tends to return the craft to its original heading and thereby maintain the craft on the proper course. In addition to the signal from bridge 53, the velocity signal from network 54 will be added to the deviation signal so that if the craft is deviating from the desired heading at a relatively high rate an additional amount of movement of the servomotor 52 will be had to stop the deviation of the craft that much sooner. If the deviation is at a relatively low rate of speed, a much smaller velocity signal will be produced, since less rudder control surface is needed in order to stop the deviation.

As the servomotor 52 is operated to reposition the rudder, wiper 65 of the rebalancing potentiometer 60 is likewise repositioned in such a direction as to attempt to rebalance bridge 53. When this balanced condition is reached, the craft has reached its point of maximum deviation and its angular velocity is zero; the wiper 33 of velocity potentiometer 80 is therefore at the midpoint of resistor 35; and since the bridge is balanced, no signal will be transmitted to the amplifier 50 and operation of the servomotor 52 will cease. However, the previous operation of the servomotor 52 has displaced the rudder from its streamlined position and hence the craft will start to return towards its original heading. As this occurs, wiper 20 of the deviation potentiometer 61 will be returned towards its center position, thereby unbalancing the bridge; and the amplifier 50 will thus receive a voltage signal opposite in phase to that first mentioned, which will cause the servomotor 52 to be operated in the opposite direction, thereby returning the rudder towards streamlined position and also moving wiper 65 of the rebalancing potentiometer 60 towards its normal position. As the wiper 20 of the deviation potentiometer is returned toward center, wiper 33 of velocity potentiometer 80 will be displaced from center in the direction opposite to that in which it was originally displaced. The effect of this will be to increase the signal applied to the amplifier 50 tending to streamline the rudder, so that there will be less tendency for the craft to overshoot or turn past its original heading. If the plane is returning towards its original heading very slowly the amount of velocity signal will be very small; whereas if the plane is returning more rapidly, the amount of velocity signal will be greater and the rudder will more nearly approach streamlined position or possibly even be moved past streamline to a position on the opposite side. The amount of the available velocity signal which is used in the system may be varied by moving wiper 84 of the voltage divider potentiometer 83.

If a permanent exterior force is applied to the aircraft tending to change its heading, the control surface must be permanently displaced to offset this force. To provide this permanent displacement of the rudder, the wipers 69, 70 may be operated to unbalance the network resulting in the movement of wiper 65 by motor 52 to rebalance the network accompanied by the concomitant displacement of the rudder. By adjusting wipers 69, 70 the gyro operated member 12 may be retained in a position corresponding to that for the desired heading whereas the rudder and wiper 65 may be displaced with respect to the position of member 12.

Network 55 comes into operation whenever the aircraft banks or rolls about its longitudinal axis, whether this happens because of air conditions, or because of control by the pilot, as described later. The potentiometer 87 is connected to the vertical gyroscope 96 so that any rolling of the craft about its longitudinal axis will cause movement of wiper 88 with respect to resistor 89, thereby causing a voltage signal to appear across the ends of potentiometer 93. The secondary 91 of transformer 90 is connected to resistor 89 so that the phasing of the signal appearing across potentiometer 93 is such as to cause the amplifier 50 to operate the servo motor 52 so as to drive the rudder in the direction opposite to that in which the craft is banking, e. g., if the plane is banking to the left, the network 55 introduces a signal tending to drive the rudder to the right.

If the aircraft, in the course of its flight, should encounter air currents which cause one wing to drop suddenly, there being no other forces tending to turn the craft, there will be a tendency for the craft to turn toward the wing which is lower. However, when the wing drops, the vertical gyroscope 96 will move wiper 88 with respect to resistor 89, and the rudder will be driven in the opposite direction, thus maintaining the craft on its heading, while the aileron circuit (not shown) operates the ailerons to restore the craft to level.

This effect, which is very desirable, is only incidental, however, to the principal reason for the network 55. When a signal is introduced into the network 51 by the turn control potentiometer 100, as described hereinafter, it is desirable to have a large initial movement of the rudder, and then to have the rudder returned toward streamlined position while the craft remains in the turn. This is accomplished by making the signal from the turn control potentiometer 100 as large as is necessary by adjustment of the rheostat 105, and then counteracting part of this signal by one of opposite phase from network 55. The object of this action is to coordinate the turn of the aircraft so that no skidding or slipping results, and a reduced rudder deflection, once the turn has been established, is necessary to do this. A human pilot will perform the same operations in making a coordinated turn. The amount of signal introduced into the network 51 by the network 55, for a given degree of bank, is determined by the position of wiper 94 of the voltage dividing potentiometer 93, and this is usually adjusted once in flight and then left alone.

Network 56 is included to provide the pilot with means to change the heading of the plane without disturbing any of the adjustments previously made. He may do this by moving wiper 101 of the turn control potentiometer 100 away from the center tap of resistor 102. The voltage signal developed thereby will be transmitted to amplifier 50 where it will operate the servo motor 52 to reposition the rudder in the desired direction and also to move the wiper 65 of the rebalancing potentiometer 60 until the entire network 51 is in balance. However, the azimuth responsive instrument 86 is designed to detect just such changes in heading; and hence when the turn control potentiometer 100 is used, the azimuth responsive instrument 86 must be disconnected from the mechanical means 12, or other means must be provided to lock the deviation potentiometer 61 with the wiper 20 thereof in center position. To secure this action, we prefer to provide a locking means 115 which may conveniently be operated by a cam-operated switch 116 controlled by the same shaft which operates the turn control potentiometer 100. When the turn has been completed, the holding means may be unlocked or the azimuth responsive instrument may again be connected to mechanical means 12 and the aircraft will thereafter maintain the new heading.

As is well known to those who pilot airplanes, when the speed of the craft through the air is relatively low, a greater movement of the control surfaces is necessary to effect a given maneuver than when the plane is flying at a higher air speed. If the same amount of control is used at the higher speed, a "hunt" will develop which indicates that the pilot is "overcontrolling." To obtain the proper operation of the craft at this speed, the movement of the control surfaces must be decreased, but if this smaller movement were used at a lower air speed the response of the aircraft would be very sluggish, and it would require an unnecessarily long time for the craft to return to its proper heading and attitude.

To provide for the different amounts of control which must be used under these different conditions, resistors 73 and 74 are connected in parallel with resistor 21 of the deviation potentiometer 61. The action of resistors 73 and 74 is to provide means for varying the total resistance of the parallel circuits including these resistors and resistor 21. The parallel circuit, consisting of resistors 21, 73, and 74 considered as a unit, and centering potentiometers 67 and 68 are all in series; and it is a characteristic of series circuits that the voltage drop across any individual resistor is to the total voltage applied to the series circuit as the resistance of that individual resistor is to the total resistance of the series circuit. In bridge 53 the voltage supplied by the secondary 64 of transformer 62 remains constant, and the combined resistance of potentiometers 67 and 68 remains a constant. As the effective resistance of rheostat 74 is decreased, the resistance of the parallel circuit consisting of resistors 21, 73, and 74 is also decreased; and hence it will be seen that the voltage applied to the ends of resistor 21 will be decreased. Similarly, as the effective resistance of rheostat 74 is increased, the voltage applied to resistor 21 will likewise be increased.

The effect of this change in voltage applied across resistor 21 of the deviation potentiometer 61 will be to change the amount of control surface movement there will be for a given deviation of the aircraft in azimuth. This result is caused by the fact that the system is a voltage responsive system. If movement of wiper 20 to one end of resistor 21 will cause a voltage signal of, say, three volts to be produced at one time, the servo motor 52 will drive the wiper 65 of the rebalancing potentiometer 60 until the three volt signal is balanced out. However, if the setting of rheostat 74 is changed so that when wiper 20 is at one end of resistor 21 a six volt signal is provided; servo motor 52 will thereupon drive wiper 65 until the six volt signal is balanced out. Since the voltage which is applied across resistor 66 of the rebalancing potentiometer 60 remains a constant, it will be seen that by adjusting rheostat 74 a greater or lesser movement of the rudder may be secured for a given degree of variation from the desired heading.

It will thus be seen that we have provided an improved means of controlling the flight of an airplane with particular regard to the control of the rudder. In actual operation this apparatus has shown itself to be decidedly superior to other means where no velocity control is provided and also superior to means wherein the velocity signal is provided as a part of the deviation signal. With our improved means, the amount of velocity signal may be varied from zero to a relatively high value, and it is thus possible to adjust this signal for the particular plane in which our system is installed. Since the adjustment is electrical in nature, it may be placed upon the control panel of the automatic pilot where it is under the control of the human pilot, and he may thus secure the most accurate flight possible under the existing air conditions.

It will also be seen that we have provided in our apparatus a control device which will furnish a velocity or derivative signal, the magnitude of which may be varied within very large limits. In addition, this derivative signal is entirely independent of any deviation signal, and hence may be separately controlled. We have shown and described our device as it may be applied to the control of apparatus of an automatic pilot for aircraft, but it will be apparent that if the ear 16 is connected to the indicating arm of a thermostat or to a galvanometer, the velocity of deviation of innumerable other conditions may be measured and used to control operating mechanisms.

While we have shown and described a preferred form of our invention, we do not wish to be limited to the particular form and arrangement of parts herein shown and described except as limited by the following claims.

We claim as our invention:

1. A control apparatus including a condition controlling member comprising: motor means for positioning said member; a condition responsive means operated according to the amount and direction of deviation of a condition from a predetermined value to provide a signal increasing with the magnitude of deviation; a second means constrained to a normal position of null condition and carried by said responsive means and responsive to the rate and direction of operation of said responsive means to provide a signal upon displacement from the normal position proportional to the rate of deviation; and motor control means including said first and second responsive means and adapted to operate said motor means in accordance with the combined response of said responsive means.

2. Control apparatus for an aircraft comprising: means for sensing movement of the aircraft about one axis; a first electrical signal generating means which provides a first alternating voltage signal whose magnitude is proportional to the extent of deviation of said aircraft about said axis; a second electrical signal generating means, having two relatively displaceable elements carried by a common member and biased to unoperated position, which provides a second alternating voltage signal whose magnitude is proportional to the rate of deviation of said aircraft about said axis; means for positioning both signal generating means by said movement sensing means; means for connecting said first and second signal generating means in electrical series relation to provide two output terminals for the connected generating means; and control surface power means including control means having a discriminator amplifier connected to said output terminals.

3. A control system for an aircraft comprising: means mechanically indicating the angular deviation of said aircraft about an axis from a normal position; a first signal means including a variable impedance which may be varied in accordance with the extent of said deviation and operated by said indicating means; a second signal means including means to transform the movement of said indicating means into movement indicating the velocity of said deviation and a variable impedance which may be varied in accordance with the velocity of said deviation; motor means operable to position an air foil surface; control means adapted to control said motor means in accordance with signals transmitted to it; and means connecting said first signal means, said second signal means, and said control means whereby said motor means is caused to operate in accordance with signals from each or both of said signal means.

4. An electric control system for a craft having a member adapted to change the direction of travel of the craft, said system comprising: motor means for positioning said member; a rebalancing impedance operated by said motor means; a course deviation sensing device, a first impedance means adjusted by said device providing a first signal varying with the amount and direction of deviation of said craft about an axis; a second impedance adjusted by said device and constrained to a normal position of no signal condition for means providing a second signal upon displacement from normal position varying with the rate and direction of said deviation; a third impedance means adapted to vary the magnitude of said second signal for a given rate of deviation without affecting said first signal; and motor control means including said rebalancing, first, second, and third impedance means and adapted to operate said motor means in response to signals from said rebalancing, first, and third impedance means whereby said members are moved and said craft is returned to its predetermined flight position.

5. Control apparatus for an aircraft comprising: means responsive to the deviation of said craft about an axis; a member operated by said responsive means; a relatively movable resistor and wiper for developing a control signal, said wiper being carried by said member; a second resistor carried by said member; a second wiper pivotally carried by said member and having means constraining it to a normal or no signal position on said second resistor; a network including said first resistor and wiper; a second network including said second resistor and wiper; whereby on movement of said member by said responsive means said wipers are displaced with respect to their resistors a signal is obtained between each wiper and resistor which in one network increases with the magnitude of the deviation and which in the second network increases with the velocity of the deviation.

6. In a control apparatus: means responsive to the magnitude and direction of a change in a condition; a member operated by said means; a balanceable electrical network including a potentiometer having a wiper and resistor said wiper being operated by said member whereby said wiper may be moved over the surface of the resistor, and said network including a second potentiometer having a resistor carried by said member with its length in the direction of operation of the member and a second wiper pivoted on said member, said wiper contacting said second resistor; means operatively engaging said second wiper and movable relative to the member for biasing said second wiper into a normal position of no signal condition on said resistor; and motor means connected to be controlled by said network, whereby movement of said condition responsive means causes said member to move the first wiper with respect to its resistor to derive a voltage between wiper and resistor to unbalance said first network to derive a signal proportional to the magnitude and direction with the change of the condition, and said member moves said second wiper with respect to its resistor against the action of the biasing means to derive a signal proportional to the velocity of said change to further unbalance said network.

7. Condition control apparatus comprising: a moveable condition responsive device; a balanceable electrical system including a first signal generator having means movable from a normal position by said device for providing a signal increasing with the magnitude of the change of said condition; a second signal generator having means movable from a normal or no signal position by movement of said device but constrained to a normal position for providing a signal increasing with the rate of change of said condition; a third signal generating having means movable from a normal position for rebalancing said system; power means for controlling said condition; means controlled by said system and operating said power means; means for operating the third generating means from said power means; and further means for manually unbalancing said system for adjusting the normal position of said third signal generating means with respect to the normal position of said first signal generating means.

8. Control apparatus for an aircraft comprising: control surface motor means; control means for said motor means; a device responsive to change in course of said craft; a first signal generating means adjusted by said device for providing a signal varying with the deviation of the aircraft about an axis; a second signal generating means adjusted by said device for providing a signal proportional to the rate of deviation of the aircraft about said axis; means for combining the outputs of said first and second signal generating means and connected to said control means; a manually operable third signal generating means having an output varying with its displacement included in said combining means; and further means effective upon operating of said third signal generating means, for introducing a signal to change the position of the aircraft about said axis, to prevent the adjustment of said first signal generator.

9. In an automatic pilot for aircraft having a control surface for controlling the movement of said aircraft about a control axis, position-maintaining means for detecting angular movement of said aircraft about said control axis, rate-responsive means for detecting rate of angular movement of said aircraft about said control axis, servo means for actuating said control surface, a turn controller, means actuated by said position-maintaining means, said rate responsive means, said turn controller, and said servo means, for generating four separate control signals, means for algebraically adding said control signals and controlling said servo means in accordance with the resultant thereof, and means responsive to displacement of said turn controller from a neutral position for rendering said position-maintaining means ineffective to alter the means generating control signals and therefore ineffective to control said servo means.

10. An automatic steering system for dirigible craft, including a control surface, driving means for operating said surface, course reference means for producing an electric signal in response to a departure of said craft heading from a predetermined course, means connected for operation by said driving means for producing a second electric signal, means responsive to said reference means for generating a third electric signal in accordance with the angular rate of departure of said craft from said predetermined course, and thermionic means for combining said three signals to control the energization of said driving means.

11. An automatic steering system for dirigible craft, comprising a control surface, a servo motor for operating said surface, course reference means for producing a first electric signal increasing in magnitude in response to increase in departure of said craft heading from a predetermined course, means operated by said motor for producing a second electric signal increasing with extent of operation of said servomotor, means for generating a third electric signal variable in phase and magnitude in response to the angular rate of departure of said craft from said predetermined course, and balanceable network means for algebraically combining said signals to control the operation of said motor including means to modify the magnitude of the existing third signal utilized in said network to alter the damping of said third signal, said third signal aiding said first signal and opposing said second signal upon initial departure of said craft from said predetermined course when the angular rate is of one phase and opposing said first signal and aiding said second signal when the craft is returning to its predetermined course when the angular rate is of opposite phase.

12. In an automatic pilot for aircraft having attitude controlling means and servo means operating said attitude controlling means, in combination: position maintaining means for detecting angular movement of said aircraft about an axis for developing a first signal, rate responsive means for detecting rate of angular movement of said craft about said axis for developing a second signal, signal developing means actuated by said servo means for providing a third signal, a mechanism comprising an amplifier and a balanceable electrical network wherein the first, second, and third signals are summed in the network said mechanism including adjustable means, the network algebraically adding said control signals and controlling said servo means in accordance with the resultant thereof, a turn controller in said network operated by the adjustable means for developing a fourth signal to change craft position about said axis and means responsive to the displacement of said turn controller from a neutral position for rendering said rate responsive means ineffective to control said servo means during displacement of said turn controller.

13. In an automatic pilot for aircraft having operable means for varying the position of said aircraft and servo means for actuating said operable means, in combination: position-maintaining means for detecting movement of said aircraft from a normal position, rate-responsive means for detecting rate of change of position of said aircraft from said normal position; a selective position change controller displaceable from a neutral position; signal generating means actuated by said position-maintaining means, said rate-responsive means, said selective position change controller, and said servo means for generating four control signals, means connected to the generating means for algebraically adding control signals and controlling said servo means in accordance with the resultant thereof, and means responsive to displacement of said selective position change controller from neutral position for rendering said position-maintaining means ineffective to additionally control said servo means during displacement of said selective position change controller from the neutral position.

14. Condition control apparatus comprising: motor means operating a condition controlling member; control means for said motor means comprising a first and a second signal provider, each provider having two relatively movable parts; means including a carrier member responsive to a change in said condition; a first signal provider part operated by said member relative to a fixed other part of said first provider to provide a first signal varying with the magnitude of the change in the condition; a second signal provider part pivoted on said member; means fixedly mounting the other part of said second provider on said member; biasing means between the two parts of said second provider effective on change of said condition to provide a second signal in accordance with the rate of change in said condition; and means for obtaining the resultant of said first and second signals and connected to said control means.

15. In an automatic pilot for aircraft having operable means for controlling the movement of said aircraft about a control axis, and servo means for actuating said operable means, in combination: a balanceable network including four incrementally adjustable elements for affecting the balance of said network and connected to said servo means, position maintaining means for detecting angular displacement of said aircraft about said control axis for adjusting a first of said elements; rate responsive means for detecting rate of angular movement of said craft about said control axis and adjusting a second element; a turn controller adjusting a third element on displacement of said controller from a neutral position; means actuated by said servo means for adjusting a fourth element; whereby adjustment of said four control elements controls said servo means in accordance with the resultant of the adjustments of the elements, and selective means for varying the relative amount of control exerted by the first and second elements on said network and thus on said servo means for a given adjustment of the first and second elements.

16. The apparatus of claim 15, and means responsive to displacement of said turn controller from a neutral position for rendering said position-maintaining means ineffective to control said servo means during displacement of said turn controller from a neutral position.

17. The apparatus of claim 15, and means responsive to the displacement of said turn controller from neutral position for rendering said rate-responsive means ineffective to control said servo means during displacement of said controller from neutral position.

18. In an automatic pilot for aircraft having a control surface for controlling the movement of said aircraft about a control axis, position-maintaining means for detecting angular movement of said aircraft about said control axis, rate-responsive means for detecting rate of angular movement of said aircraft about said control axis, servo means for actuating said control surface, a turn controller, signal generating means actuated by said position-maintaining means, said rate responsive means, said turn controller, and said servo means, for generating four separate control signals, means connected to the generating means for algebraically adding control signals and controlling said servo means in accordance with the resultant thereof, and means responsive to displacement of said turn controller from a neutral position for rendering said rate responsive means ineffective to alter the means generating control signals and thereby ineffective to control said servo means.

References Cited in the file of this patent

UNITED STATES PATENTS

| | | |
|---|---|---|
| 1,418,335 | Sperry | June 6, 1922 |
| 1,703,280 | Minorsky | Feb. 26, 1929 |
| 2,151,718 | Riggs | Mar. 28, 1939 |
| 2,168,032 | Japolsky | Aug. 1, 1939 |
| 2,278,396 | Saur | Mar. 31, 1942 |
| 2,376,599 | Jones | May 22, 1945 |
| 2,403,605 | Lesnick | July 9, 1946 |
| 2,414,430 | Nisbet | Jan. 14, 1947 |
| 2,452,311 | Markusen | Oct. 26, 1948 |
| 2,625,348 | Noxon et al. | Jan. 13, 1953 |